United States Patent [19]

Leung et al.

[11] Patent Number: 4,486,665
[45] Date of Patent: Dec. 4, 1984

[54] NEGATIVE ION SOURCE

[75] Inventors: Ka-Ngo Leung, Hercules; Kenneth W. Ehlers, Alamo, both of Calif.

[73] Assignee: The United States of America as represented by the United States Department of Energy, Washington, D.C.

[21] Appl. No.: 405,963

[22] Filed: Aug. 6, 1982

[51] Int. Cl.$^3$ .............................................. H01J 27/00
[52] U.S. Cl. .................................. 250/427; 250/423 R; 376/129
[58] Field of Search .......................... 250/423 R, 427; 376/129, 130; 315/111.81

[56] References Cited

U.S. PATENT DOCUMENTS

| | | | |
|---|---|---|---|
| 4,140,943 | 2/1979 | Ehlers | 315/111.4 |
| 4,233,537 | 11/1980 | Limpaecher | 376/129 |
| 4,329,586 | 5/1982 | Dagenhart et al. | 250/423 R |
| 4,377,773 | 3/1983 | Hershcovitch et al. | 250/423 R |

OTHER PUBLICATIONS

*LBL-14292*, "Volume-Produced H$^-$Multicusp Source", Leung et al., 8-6-82, pp. 1-23.
*LBL-14292 Abstract*, "H$^-$Ion Production and Electron Suppression in a Magnetically-filtered Multicusp Source", Leung et al., Jul. 19, 1982.
"Self Extraction Negative Ion Source", Leung et al., *Rev. of Sci. Inst.*, 53 (6), Jun. 1982, pp. 30-36.
"Multicusp Negative Ion Source", *Rev. of Sci. Inst.*, Ehlers et al., 51 (6), Jun. 1980, pp. 721-727.
"Electron Suppression in a Multicusp Negative Ion Source" *Appl. Phys. Lett.*, 38 (4) Ehlers et al., Feb. 1981, pp. 287-289.
"H$^-$Ion Formation from a Surface Conversion Type Ion Source", Leung et al., *J. Appl. Phys.*, 52 (6), Jun. 1981, pp. 3905-3911.

*Primary Examiner*—Bruce C. Anderson
*Attorney, Agent, or Firm*—L. E. Carnahan; Roger S. Gaither; Michael F. Esposito

[57] ABSTRACT

An ionization vessel is divided into an ionizing zone and an extraction zone by a magnetic filter. The magnetic filter prevents high-energy electrons from crossing from the ionizing zone to the extraction zone. A small positive voltage impressed on a plasma grid, located adjacent an extraction grid, positively biases the plasma in the extraction zone to thereby prevent positive ions from migrating from the ionizing zone to the extraction zone. Low-energy electrons, which would ordinarily be dragged by the positive ions into the extraction zone, are thereby prevented from being present in the extraction zone and being extracted along with negative ions by the extraction grid. Additional electrons are suppressed from the output flux using ExB drift provided by permanent magnets and the extractor grid electrical field.

17 Claims, 14 Drawing Figures

NEGATIVE ION SOURCE

BACKGROUND OF THE INVENTION

1. Field of the Invention

This invention relates to ion sources and, more particularly, to large-volume negative ion sources. The U.S. Government has rights in this invention pursuant to Contract No. DE-AC03-76SF00098 with the U.S. Department of Energy.

2. Prior Art

An important application of ion sources is in neutral-beam injection systems for fusion energy experiments and reactors. Ions from these sources are electrostatically accelerated to high energies and subsequently neutralized to provide a beam of high-energy, neutral atoms. The neutral-beam injection systems provide megawatts of energy for heating plasmas in magnetic-confinement fusion energy devices such as tokamaks and mirror fusion devices. The initially cold, or low energy, plasma ions within these fusion energy devices are heated to high energies by being bombarded with high-energy particles from the neutral beam sources. The extremely high magnetic fields of magnetic-confinement types of fusion energy devices not only effectively confine the plasma but also prevent charged particles from penetrating the plasma. Because neutral particles are not affected by strong magnetic fields, high-energy neutral particles provide a good choice for heating these fusion plasmas. When energetic neutral particles or atoms enter the fusion plasma, they are re-ionized by the plasma electrons. These energetic, or hot ions, are then contained by the reactor magnetic fields.

Positive ions are used extensively in present-day neutral-beam systems because positive ions are relatively easy to generate using an electron discharge of, for example, 80 eV electrons. A typical source for producing positively charged hydrogen ions is shown in U.S. Pat. No. 4,140,943, granted Feb. 20, 1979 to Kenneth W. Ehlers. Hydrogen is injected into a plasma generator vessel where it is ionized by a high-current electron discharge provided by a plurality of tungsten filaments. The extractor grids for these positive ion sources are at a negative potential with respect to the ionized plasma. Electrons are suppressed from appearing in the output flux because the negatively-charged electrons are repelled by the negative potential on the extractor grids. To be converted to high energy neutral particles, the positive ions from the ion source are electrostatically accelerated to high energies and subsequently neutralized by being passsed through a low-pressure gas cell where charge exchange neutralization takes place.

One problem with using positive ions in neutral-beam systems is that as the accelerating potential for the positive ions is increased, it becomes increasingly more difficult to neutralize the positive ions. As the ion accelerating potentials are increased, greater and greater percentages of the ionized particles cannot be converted to neutral particles. The unneutralized positively charged particles are either repelled or diverted from entering the plasma and, consequently, make no contribution to increasing the plasma energy. As the ion energies increase, positive ion sources therefore have decreasingly lower efficiencies in terms of heating the plasma. A typical requirement for neutral beam power to heat plasma in a magnetically confined fusion device is on the order of megawatts; and it should be appreciated that decreasing efficiency is a significant drawback when positive-ion neutral beam sources are considered for higher energy neutral beam sources.

It is anticipated that future fusion energy devices will require even more energy input to maintain sustained operation. Neutral beams are being considered for this purpose. As the need for higher and higher energy neutral beam system continues to develop, the use of negative ions, rather than positive ions, in neutral beam systems becomes an attractive alternative because neutralization of negative ions is considerably more efficient for high energy negative ions than for positive ions. In the case of negative hydrogen or deuterium ions, an electron is attached to the neutral atom by a weak 0.7 eV bond so that neutralization for example, by laser beams, is relatively easy to accomplish. Neutralization efficiencies greater than sixty percent are possible for negative hydrogen and deuterium ions having energies greater than 150 keV.

However, in spite of the attractiveness of using negative ions, present high-current sources of negative ions have the problem that the negative ions extracted from such sources are accompanied by considerable numbers of undesired electrons so that a considerable amount of power is wasted in accelerating these large numbers of electrons. These high-energy electrons would also produce considerable amounts of undesired X-rays. These large number of electrons are normally separated from a negative hydrogen ion beam by using an ExB electron extractor which diverts them to collector electrodes. Creation and interception of large numbers of electrons from the output of a negative ion source requires a considerable amount of power and is a substantial power drain on a system. Therefore, it is desireable that as many electrons as possible be suppressed from the output flux of a high-current negative ion source.

One approach for the production of negative hydrogen ions is disclosed in a paper entitled "A Self-extraction Negative Ion Source" presented in *Review of Scientific Instrumentaion* 53, June 1982, page 30, by Leung and Ehlers. The approach described therein accelerates positively ionized hydrogen and cesium particles through a positive potential of approximately two hundred volts to strike a copper converter surface. Negative ions are formed at the converter surface and accelerated away by the same positive potential. Cesium is a very active substance which is hazardous and is difficult to handle. Sputtering from the converter surface is another problem with this technique.

SUMMARY OF THE INVENTION

It is an object of this invention to provide a volume source of negative ions which has electrons suppressed from the output thereof.

It is another object of the invention to provide a negative ion source which efficiently provides a large flux of negatively ionized particles.

To achieve the foregoing and other objects of the invention and in accordance with the purpose of the present invention, as embodied and broadly described herein, a method and apparatus are disclosed for providing a negative ion source. The invention is particularly useful for generating large volumes of negative ions which are electrostatically accelerated to high energies and subsequently neutralized to form a high-energy neutral beam which is then used to heat a magnetically-confined plasma.

The apparatus according to the invention is a source of negative ions generated from neutral molecules and atoms. The source includes a vessel having a chamber formed therein for containing particles ionized by high-energy ionizing electrons. The vessel has an anode portion for a discharge means which ionizes the neutral molecules and atoms. In one embodiment of the invention, the vessel walls form the discharge anode. Magnetic filtering means for reflecting high-energy electrons extend across the chamber and divide it into two zones, one is an ionizing zone and the other is an extraction zone. In one embodiment of the invention, the filtering means is provided by a magnetic field supplied in a more specific embodiment of the invention by permanent magnets. A positively-biased extractor assembly provides a means, that is, an electric field, for extracting a flow of negative ions from the extraction zone. A plasma grid is located adjacent the extraction zone of the ionization vessel biased and is slightly positive with respect to the anode to increase the plasma potential in the extraction zone to suppress electrons from the negative ion output flux. This is contrary to what might be expected but positively biasing the plasma grid, in fact, reduces the number of low-energy electrons in the output flow of negative ions even though, ordinarily, it would be expected that a positive bias on the plasma grid would attract electrons into the ion-source output being extracted by the positive potential of the extractor flow. Low-energy electrons get into the extraction zone by being dragged along with the positive ions which originate in the ionizing zone and pass through the magnetic filter extending across the chamber. However, in this case, that is, with a slight positive bias on the plasma grid, positive ions are repelled from entering the extraction zone because the plasma potential of the extraction zone is made more positive by the positive bias on the plasma grid. Since low-energy electrons are not present in the extraction zone, it follows that they cannot be drawn therefrom by the extractor electric field. Further aspects of the invention include additional means for suppressing electrons from the output which include, for example, a means for providing a magnetic field aligned with respect to the electric field of the extractor to provide EXB drift to the electrons.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the invention and, together with the description, serve to explain the principles of the invention. In the drawings.

DETAILED DESCRIPTION OF THE PREFERRED EMBODIMENT

Reference is now made in detail to the present preferred embodiment of the invention which illustrates the best mode presently contemplated by the inventors of practicing the method and apparatus of the invention, preferred embodiments of which are illustrated in the accompanying drawings.

The ion source for negative ions described below is constructed very much like the positive ion source described in copending U.S. patent application Ser. No. 374,847 filed May 4, 1982 by the same inventors of the present application. That application is hereby incorporated by reference.

Figure 1:
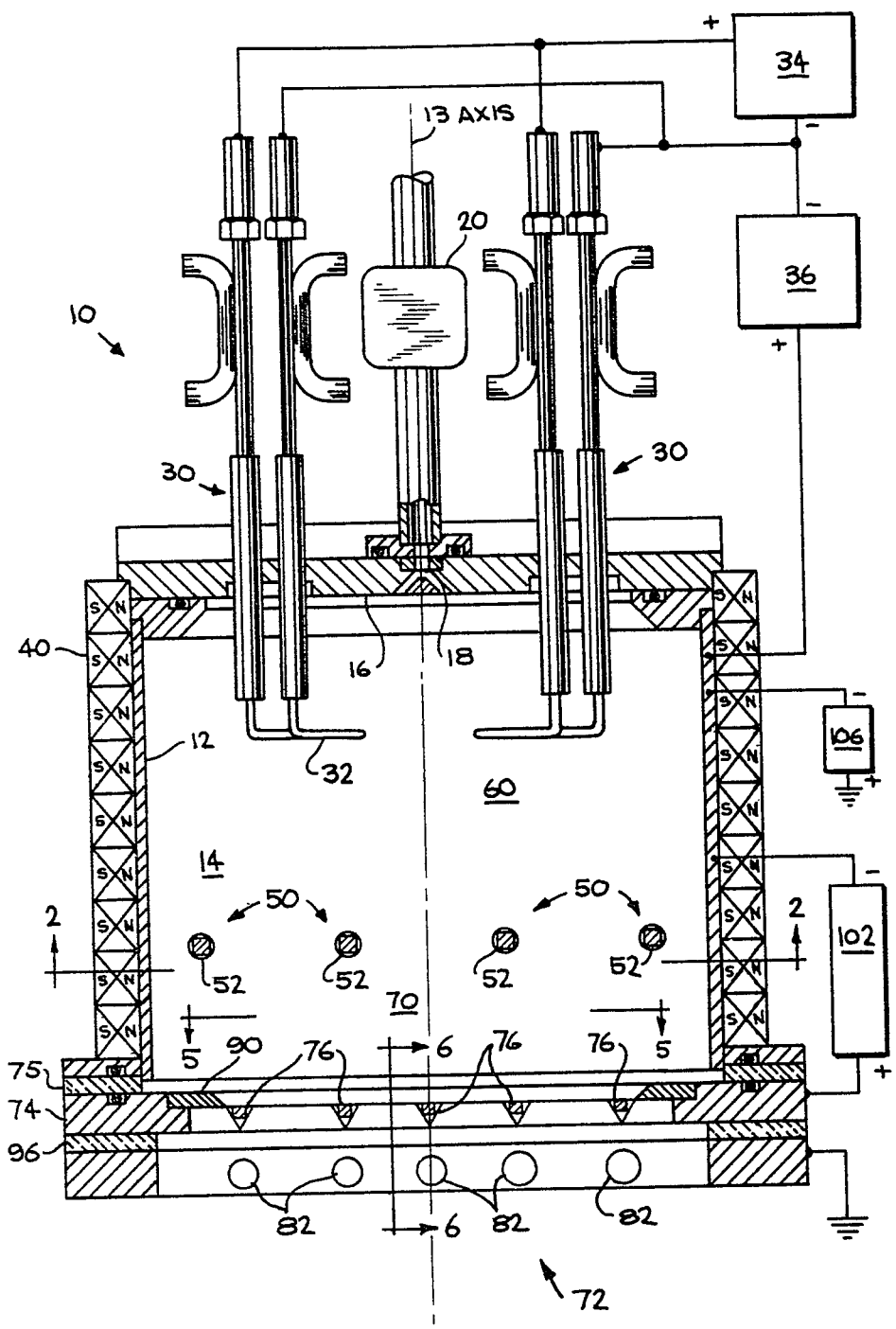
FIG. 1 is a longitudinal partially sectional view of an ion source incorporating the invention.

Referring now to the drawings, FIG. 1 shows an embodiment of a negative ion source 10. The hollow interior of a cylindrical stainless steel vessel 12, having a diameter of 20 cm and a length of 24 cm along an axis 13, has a chamber 14 formed therein for containing ionized hydrogen. One end of the vessel 12 is closed by an end flange member 15 having a copper end plate 16 attached thereto. Hydrogen gas molecules are injected into the chamber 14 through a passageway 18 formed in the end plate. A pulsed gas valve 20 is actuated to release hydrogen gas from a source, not shown, into the chamber just prior to ionization of the gas. In this embodiment, the hydrogen molecules and atoms are ionized by a discharge of high-energy electrons, that is, electrons having energies of approximately 80 eV. A plurality of water-cooled tungsten filament assemblies 30 serve as means for discharging, or emitting, these high-energy 80 eV electrons for ionizing the hydrogen molecules and atoms. Heaters for the tungsten filaments 32 are powered by an 8 volt, 1000 Ampere filament heater supply 34. An 80 volt, 700 Ampere electron discharge power supply 36 has its negative terminal connected to each of the filament assemblies 30 and its positive terminal connected to the conductive copper vessel 12. The filaments 32 are the cathodes and the vessel 12 is an anode for the electron discharge.

A plurality of spaced-apart samarium cobalt permanent magnets 40 having a field strength of 3.6 kG are fixed into grooves on the outside of the stainless steel vessel 12 and the copper end plate 16. The magnets are arranged into assemblies in which the poles alternate and provide a multi-cusped magnetic field within the ionization chamber 14.

Figure 2:
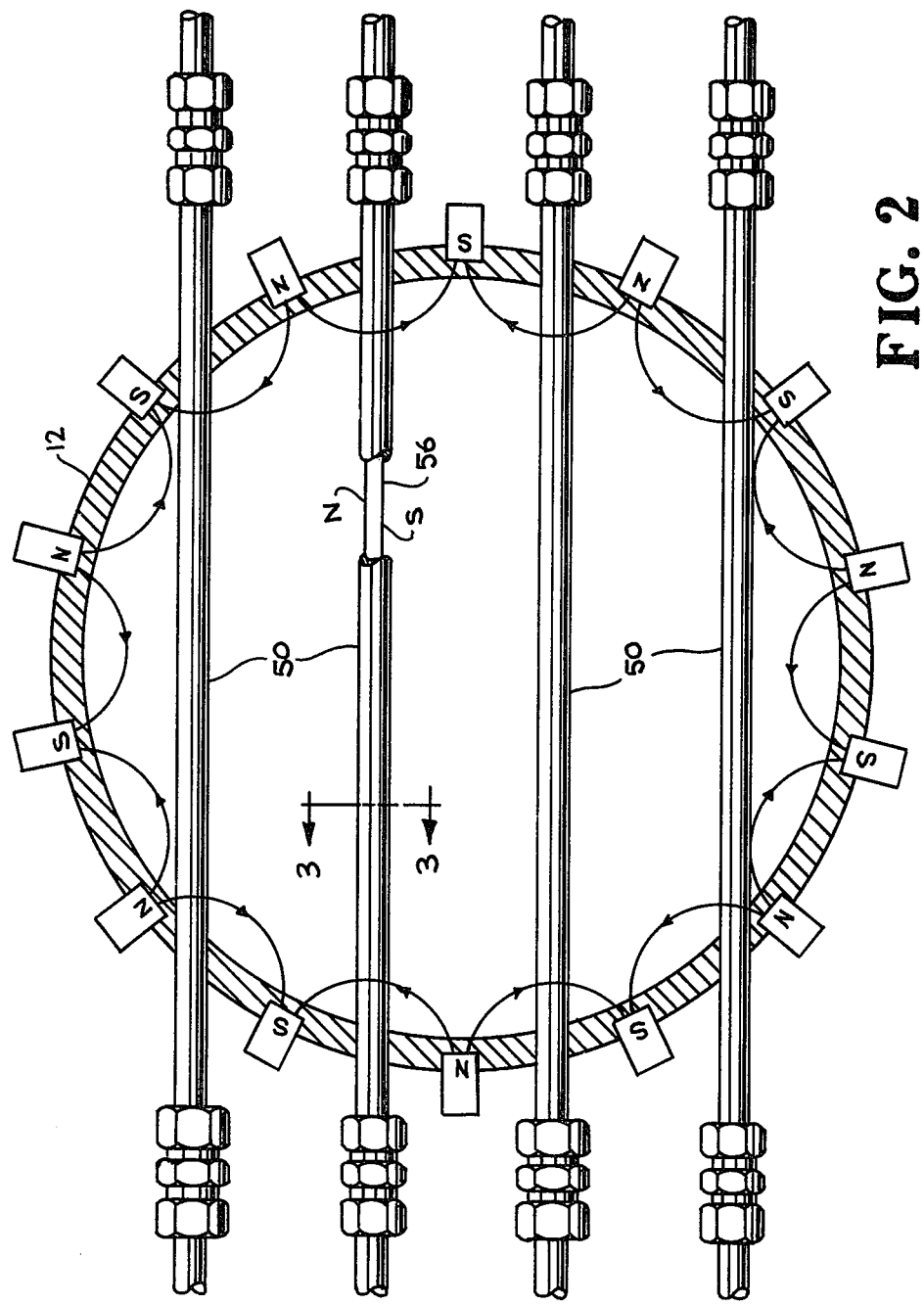
FIG. 2 is a section view of an ionization vessel taken along section line 2—2 of FIG. 1.
Figure 3:
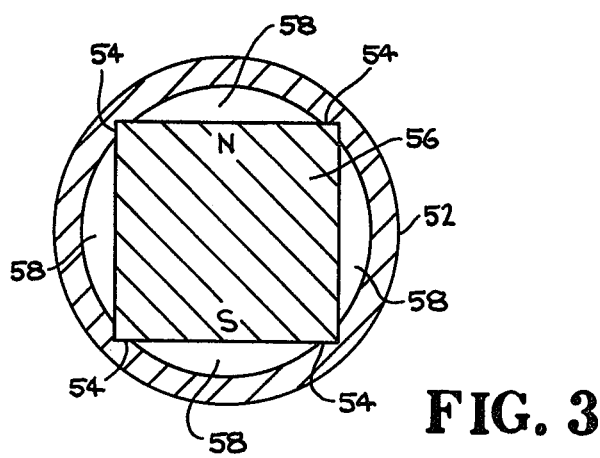
FIG. 3 is a cross-section view taken along section line 3—3 of FIG. 2 showing a portion of a permanent magnet and a tube for positioning and cooling the magnet.

FIGS. 2 and 3 show the details for a plurality of magnetic filter assemblies 50, which provide a preferred embodiment of a magnetic filter means extending across the chamber 14 for reflecting high-energy electrons. A plurality of hollow 6 mm diameter copper tubes 52, spaced-apart by 4 cm, extend across the interior of the vessel 12. As shown in FIG. 2, the tubes 52 extend through apertures formed through the wall of the vessel 12 and are brazed thereto to provide a vacuum seal. As shown in FIG. 3, the interior walls of the hollow copper tubes 52 are broached to provide a series of equally-spaced, longitudinally extending registration grooves 54 for receiving and fixing in place a number of samarium cobalt permanent magnets 56. The permanent magnets are each several centimeters long and have square cross sections with sides 3.5 mm long. The corners of each permanent magnet engage the registration grooves 54, leaving longitudinally extending cooling channels 58 adjacent to each side of a permanent magnet 56. A cooling fluid, such as water, is pumped through the channels 58 to cool the magnets which are heated when plasma particles within the vessel 12 collide with the copper tubes 52 holding the permanent magnets 56 in position within the ionization chamber 14.

Figure 4:
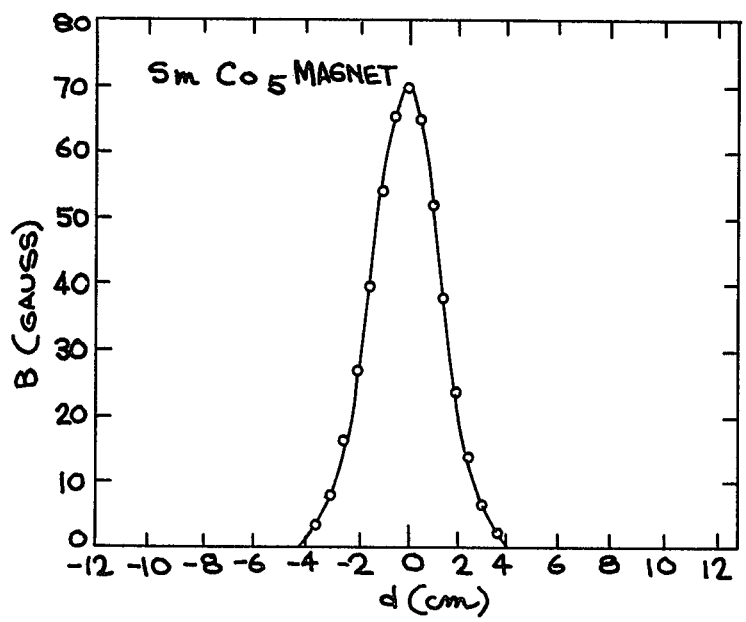
FIG. 4. is a graph plotting magnetic field strength versus distance from the filtering magnetic field for one embodiment of the invention.

The permanent magnets 56 in each of the assemblies 50 provide a magnetic field of 75 Gauss and are oriented within the hollow copper tubes 52 such that adjacent assemblies have opposite magnetic poles facing each other as indicated in FIG. 1. FIG. 4 shows a plot of magnetic field B as a function of distance away from the plane in which the magnetic filter assemblies lie.

The magnetic field provided by the magnetic filter assemblies 50 were chosen to provide a strong magnetic field, stronger than that required for a positive ion source because electrons in a positive ion source are naturally repelled by the negative extractor potential. The magnetic field divides the chamber 14 within the ionization vessel 12 into two zones. The first zone is an ionizing zone 60 formed between the end plate 16 and the magnetic filter assemblies 50. The second zone is an extraction zone 70 formed within the vessel 12 on the other side of the magnetic filter assemblies and containing ions and relatively few high-energy electrons.

The 80 eV high-energy electrons with relatively high velocities are confined within the ionizing zone because they are deflected by the relatively strong magnetic field provided by the magnetic field assemblies 50. However, lower velocity particles such as ions and low-energy electrons can pass through the magnetic filter. It is not fully understood why lower-energy electrons pass through, but it is believed that positive ions drag them through as the positive ions drift through the magnetic field. Thus, it should be apparent that preventing positive ions from passing through the magnetic field would also prevent low-energy electrons from doing the same.

As shown in FIG. 1, the extraction zone extends between the magnetic field provided by the magnetic filter assemblies 50 and an ion extraction system 72. A plasma grid assembly 74 is attached to the end of the vessel 12 and electrically insulated therefrom with the insulator 75. The plasma grid assembly includes a plurality of spaced-apart conductive grid members 76 positioned adjacent the ion extraction zone 70. The extractor grid assembly 80 of the ion extraction system 72 includes a plurality of spaced-apart conductive extractor grid members 82 positioned opposite the ion extraction zone of the vessel 12 as shown in FIG. 1.

Figure 5:
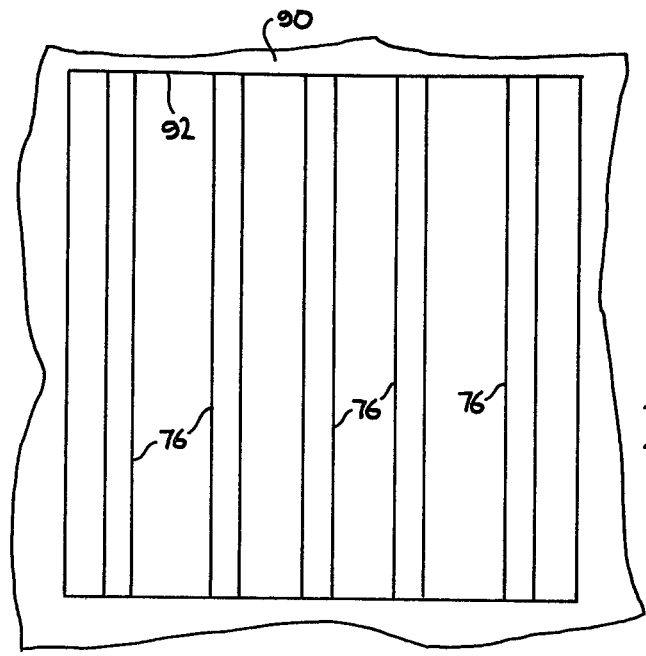
FIG. 5 is transverse sectional view taken along section line 5—5 of FIG. 1 and showing details of the plasma and extractor grids.

As shown in FIG. 5, an aperture masking plate 90 is located at the end of the vessel 12 adjacent the extraction zone 70. The masking plate 90 has an aperture 92 formed therethrough which controls the cross-sectional area of the ion output beam from the ion source 10.

Figure 6:
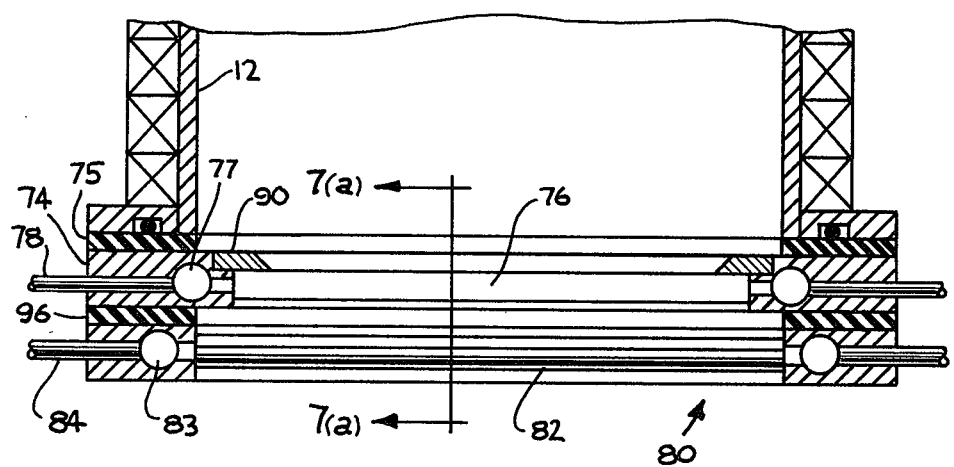
FIG. 6 is a sectional view taken along section line 6—6 of FIG. 1 showing a masking plate and the plasma grid.

FIG. 6 shows the aperture masking plate 90 and the plasma grid elements 76 electrically tied together. The plasma grid elements 76 are water-cooled via the manifolds 77 connected to the inlet pipe 78, as shown. Similarly the extractor grid members 82 are water cooled using the manifolds 83 connected to the inlet pipe 84. The plasma grid assembly 74 and the extractor grid assembly 80 are electrically insulated from each other by the insulator 96.

The plasma grid assembly 74 is biased slightly more positive than the vessel 12, that is, approximately 4 volts, by a plasma grid bias voltage supply 102 shown in FIG. 1. This slight positive voltage on the plasma grid biases the plasma in the extraction zone 70 more positive such that the plasma potentials between the ionizing zone 60 and the extraction zone 70 decreases. As a result of this decrease in the plasma potential differential, positive ions are inhibited from leaving the ionizing zone 60 and crossing the magnetic field provided by the magnetic filter assemblies 50 into the extraction zone 70. The magnetic filter inhibits passage of high-energy electrons from the ionizing zone to the extraction zone. However, the magnetic filter does not prevent low-energy electrons from passing from the ionizing zone 60 into the extraction zone 70. Since the electrons have a negative charge and the extraction potential provided by the extractor grid assembly 80 is on the order of thousands of volts positive with respect to the extraction zone 70, any electrons in the extraction zone 70 are drawn into the output flux, which as mentioned previously creates a serious power drain and generates large amounts of x-rays for large numbers of electrons drawn into the ion accelerating system. Although the exact process of how low-energy electrons penetrate the magnetic filter is not yet fully understood, it has been found that the density of electrons in the extraction zone 70, and consequently the number of extracted electrons, is closely related to the number of positive ions which pass through the magnetic filter.

Figure 8:
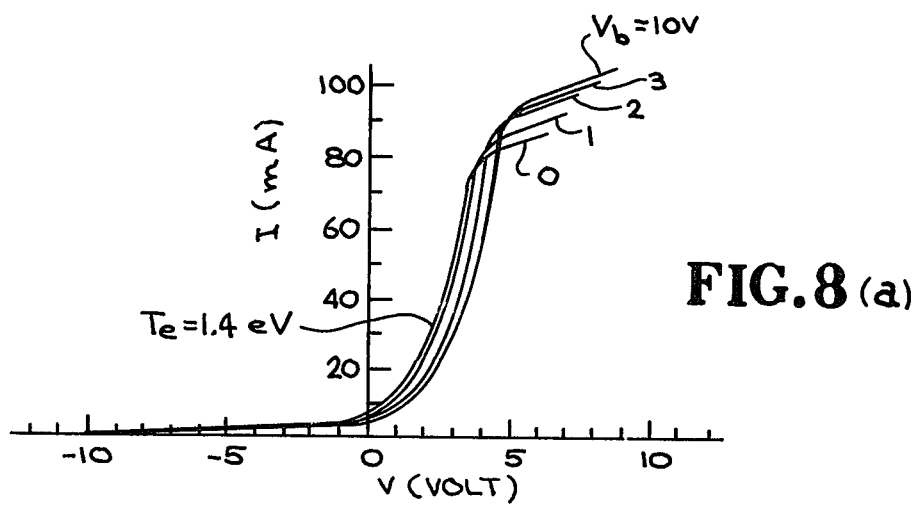
FIGS. 8(a) and 8(b) are graphs of Langmuir probe characteristics obtained, respectively, in the ionizing and extraction zones for a strong samarium cobalt magnet filter.
Figure 8:
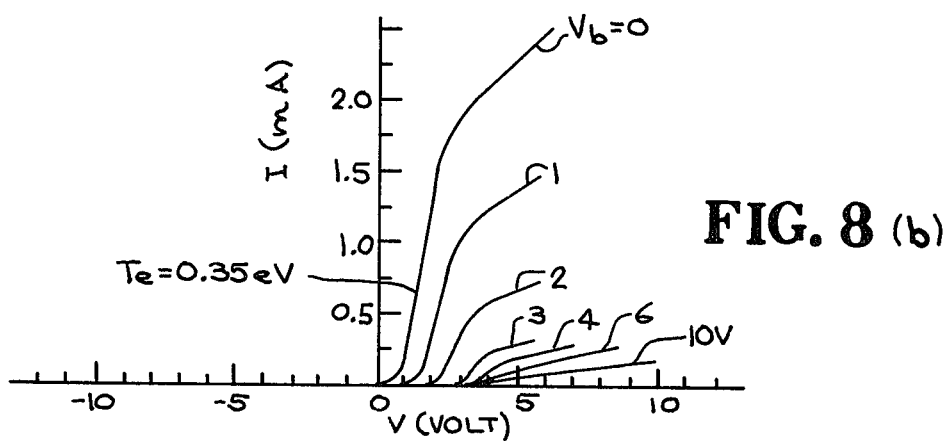

FIG. 8(a) shows a graph of Langmuir probe measurements for an 80 volt, 1 Ampere discharge at an actual pressure of $1.5 \times 10^{-3}$ Torr., the measurements were taken with the Langmuir probe located at the center of the ionizing zone 60. The graph shows probe current and voltages for fixed bias voltages $V_b$ between the plasma grid 74 and the vessel 12. The upper break point of each curve indicates the plasma potential, which is seen to range between approximately four to five volts for $V_b$ between zero and ten volts. FIG. 8(b) shows Langmuir probe measurements for the same arrangement as in FIG. 8(a) with the measurements taken in front of the plasma grid 74 within the extraction zone 80 for the same range of $V_b$. With no bias on the plasma grid, that is, when V is zero, the potential of the ionizing zone 60 is approximately 1.5 volts more positive than the potential of the extraction zone 70. This potential gradient tends to drive positive ions from the ionizing zone 60 into the extraction zone 70, bringing electrons with them. The potential gradient also inhibits negative ions from passing into the extraction zone 70 and even accelerates negative ions, which are produced in the extraction zone by processes such as dissociative attachment of vibrationally excited hydrogen molecules, backwards into the ionizing zone 60.

From FIGS. 8(a) and 8(b) it can be seen that as $V_b$ is increased, the differential plasma potential between the ionizing and the extraction zones decreases. As a result, it becomes more difficult for the positive ions, and consequently low-energy electrons, to enter the extraction zone 70. Consequently, the extracted positive ion current $I^+$ and the extracted electron current $I_e$ are reduced.

Figure 9:
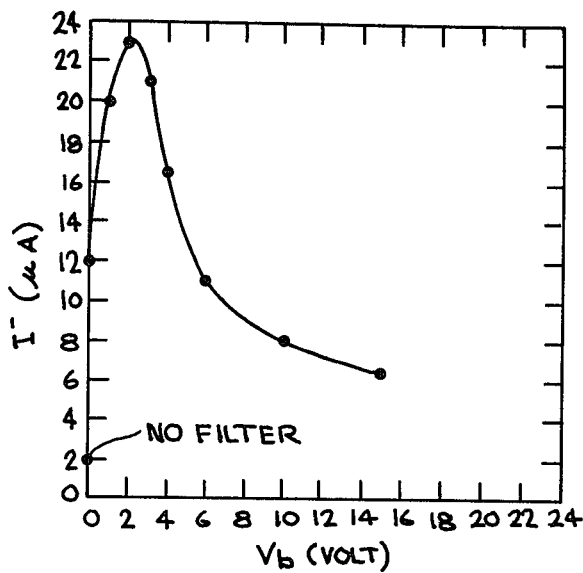
FIGS. 9(a), 9(b), and 9(c) are graphs, respectively, of extracted negative hydrogen ion current, extracted electron current, and positive ion current for a strong magnetic filter as a function of plasma grid voltage.
Figure 9:
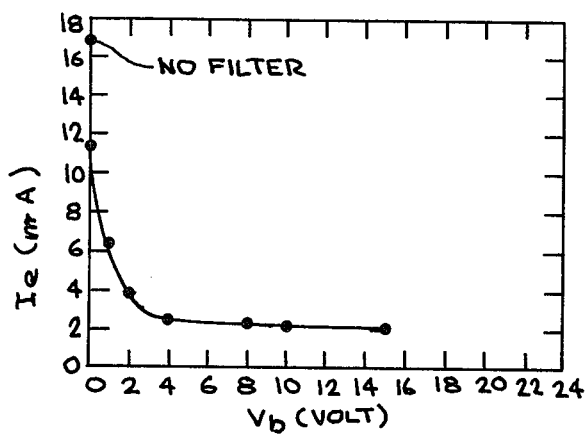
Figure 9:
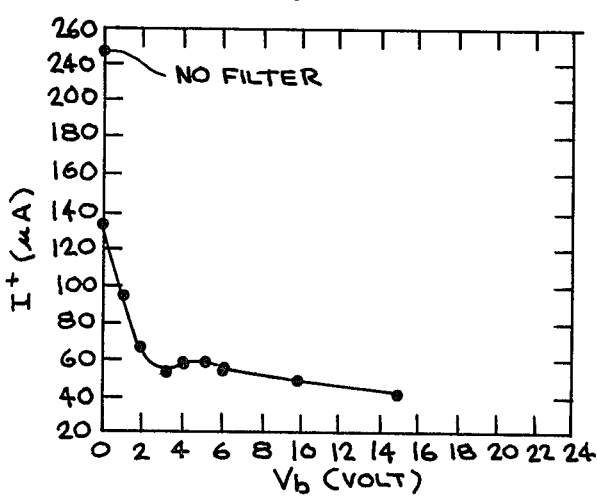

Experimental results are shown in FIG. 9 (a), (b) and (c). In this case, the aperture 92 in the masking plate 90 was masked down to a small 0.15 cm × 1.3 cm rectangular extraction slot for accurate measurements. FIG. 9 (a) is a plot of extracted hydrogen negative ion curent $I^-$ as a function of $V_b$, the bias voltage on the plasma grid 74. FIG. 9 (b) is a plot of extracted electron current $I^e$. FIG. 9 (c) shows the extracted positive ion current $I^+$ when the polarity of the extractor power supply 102 is reversed.

A negative 1,000 volt potential was applied to the vessel 12 with respect to ground. The beam thereby extracted was then analyzed by two diagnostic techniques. The first diagnostic technique used a compact magnetic-deflection mass spectrometer, which was located just outside the extractor. This diagnostic was used for relative measurement of the extracted $H^-$ ion as well as for analysis of the extracted ion species. However, this diagnostic provides relative measurements and could not provide the exact values of $H^-$ or electron current in the extracted beam. The second diagnostic technique used a permanent magnet mass separator which was located just behind the extractor assembly 80. This technique used a Faraday cup to measure the extracted negative ion current $I^-$ and electron current $I_e$. Electrons were deflected onto a graphite collector by the weak magnetic field produced by a pair of thin ceramic magnets. The negative ions which were only slightly affected by the weak magnetic field passed into the Faraday cup. A small positive bias potential on the cup was used to suppress the secondary electrons. With this arrangement, it was possible to measure the ratio of extracted $H^-$ ion current to electron current as well as the extracted $H^-$ ion current density for various operational conditions. For an ionizing electron discharge current of one Ampere, the extracted negative ion current density for the negative source 10 is estimated to be 0.12 mA/cm² with further increases obtained by optimizing the magnetic filter geometry and the extraction voltage level.

Using the magnetic filter 50 with samarium cobalt magnets 56, FIG. 9(a) shows that for $V_b=0$ an extracted negative ion current of 12 microamperes was obtained. FIG. 9(a) shows that as $V_b$ is increased, more negative ions $I^-$ can be extracted because negative ions formed in the ionizing zone 60 can cross the magnetic filter and because those negative ions produced in the extraction zone 70 are not accelerated backwards into the ionization zone 60. Increases in $V_b$ beyond about four volts shows a decrease in negative ion current.

FIGS. 9(b) and 9(c) show that when $V_b$ is increased beyond four volts, no further reductions in electron currents or positive ions are observed. For $V=0$, the extracted electron current $I_e$ is about 11.5 milliamperes and, for increasing $V_b$, $I_e$ decreases to about 2.8 milliamperes at $V_b=2.5$ volts. Thus, by using relatively strong samarium cobalt magnets 52 and setting $V_b=0$ volts, the ratio of $I^-/I_e$ is improved to 1/120.

FIGS. 9(a) and 9(b) show that without the magnetic filters 50 and with $V_b=0$ a negative ion current of approximately 2 microamperes as shown in FIG. 9(a) was extracted from the source with a dischgre current of 1 A. However, this negative ion extraction was accompanied by about 17 ma of electron current as shown in FIG. 9(b). Thus the ratio of extracted negative ion current to electron current is 1/9,000. When the polarity of the extraction power supply was reversed, 245 microamperes of positive hydrogen ion current was measured for the same discharge current and extraction voltage without the magnetic filter 50, as shown in FIG. 9(c). Therefore, the ratio of $I^-/I^+$ is approximately 1/120.

In order to extract negative ions from the source 10, the extractor grid 80 is biased positively with respect to the vessel 12. In the embodiment of the invention shown in FIG. 1, this positive bias is obtained by grounding the extractor grid assembly 80 and applying a large negative extractor voltage between the vessel 12 and ground using the extractor bias voltage supply 106 as shown in FIG. 1. For the measurements above, the extractor voltage was approximately 1,000 volts but extractor voltage can range from one to ten thousand volts. Additional accelerator stages (not shown) then accelerate the negative ions extracted from the ion source to voltages as high as one megavolt. If laser beams are utilized to neutralize the negative hydrogen ions, the extractor grid assembly 80 can be connected to a high positive voltage and the vessel 12 grounded.

Figure 7:
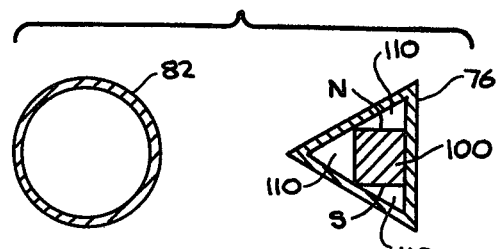
FIG. 7(a) is a sectional view of a plasma grid taken along section line 7(a)—7(a) of FIG. 6 showing an extractor grid element and a plasma grid element having a permanent magnet positioned therein.
FIG. 7(b) is a view as in FIG. 7(a) showing an alternative plasma grid element formed from a conductive permanent magnet material.
Figure 7:
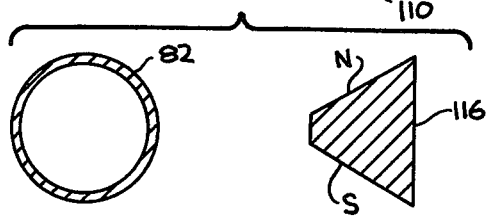

FIG. 7(a) shows a cross-section view through a plasma grid member 76 which is a hollow triangular tube with a permanent magnet 100 positioned therein. The permanent magnet is part of an additional means for suppressing electrons from the flow of negative ions produced by the extractor. The permanent magnets 100 are ceramic and have side dimensions of 0.2 and 0.25 cm and lengths of 3.0 cm. A series of permanent magnets 100 are positioned within the conductive tubular plasma grid members 76 with the spaces between the faces of the magnets and the interior surfaces of the triangular grid members 76 forming passages 110 for cooling water. FIG. 7(b) shows an alternative configuration to the grid member 76. A plasma grid member 116 is formed from conductive Alnico 5 material and permanently magnetized. The plasma grid members 76 and the extractor grid members 82 are hollow to provide passageways for water to cool these members as they are bombarded by charged particles being extracted from the source.

The maximum B-field provided by the ceramic magnets 100 is about 350 G falling off rapidly within 0.5 cm. For an extraction voltage of 1000 volts, an electron that reaches the plasma grid will acquire an energy of 500 eV. The electric field of the extractor and the B field of the ceramic magnets 100 will cause ExB drift of those 500 eV electrons away from the extractor in a cycloidal motion. The much heavier negative hydrogen ions will pass through with little effect.

Figure 10:
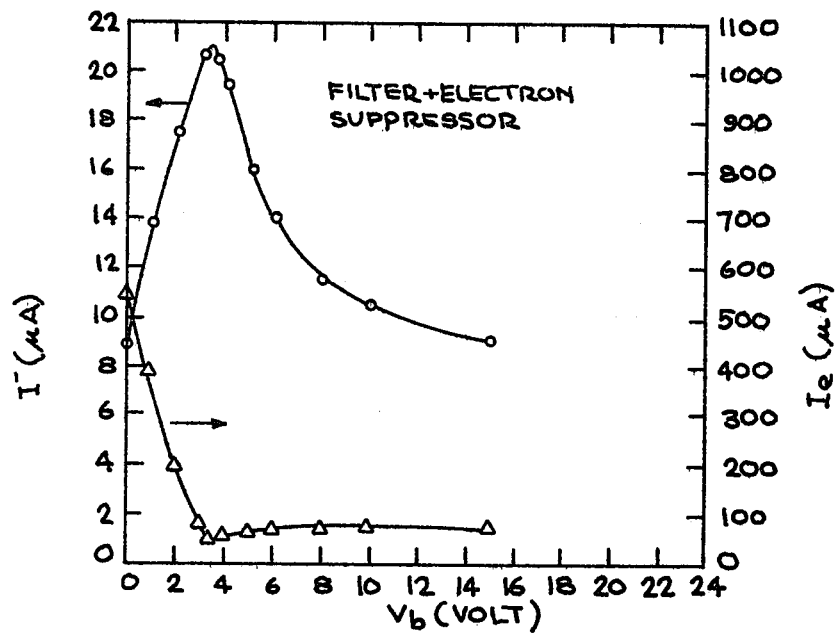
FIG. 10 is a graph of the extracted negative ion and the extracted electron current as a function of plasma grid voltage for a strong magnetic filter and an electron suppressor.

FIG. 10 shows the extracted negative ion and electron currents as a function of $V_b$ using the ExB electron suppressor means. FIG. 10 shows that there is no significant change in the negative ion current when the plasma grid 74 is biased at 2.5 volts. However, using the ExB suppressor, the electron current drops by a factor of almost 50. Additional electron suppresssion is obtained by placing a small wire with respect to the plasma grid, at one end of the extraction aperture to collect the drifting electrons. A ratio of negative ions to electrons of almost unity is thereby obtained.

The foregoing description of preferred embodiments of the invention have been presented for purposes of illustration and description. They are not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto and their equivalents.

We claim:

1. A negative ion source for ionizing neutral molecules and atoms, comprising;
    a vessel having a chamber formed therein, said vessel having a portion thereof forming an anode for an electron discharge;
    means for injecting molecules and atoms to be ionized into said vessel;
    discharge means forming a cathode for emitting high-energy ionizing electrons which ionize neutral molecules and atoms injected into said vessel;
    magnetic filter means extending across said chamber for relfecting high-energy electrons while allowing ions to pass therethrough, said magnetic filter means dividing the chamber into an ionizing zone containing ionized particles formed by the discharge means and electrons and into an extraction zone containing ions and relatively few high-energy electrons;
    extractor means coupled to the extraction zone and positively biased to provide an electric field for extracting negative ions from the chamber, said extractor means including a plasma grid assembly and an extractor grid assembly;
    said plasma grid assembly being positioned adjacent to the extraction zone, electrically insulated from said anode, and biased slightly positive with respect to the anode to increase the plasma potential in the extraction zone and repel positive ions from the extraction zone to thereby reduce the number of low-energy electrons present in the extraction zone with the result that electrons are suppressed from the output flow of negative ions from the ion source;
    said extractor grid assembly being positioned adjacent to and electrically insulated from the plasma grid assembly and biased highly positive with respect to the anode.

2. The ion source of claim 1 including means located adjacent to the extraction zone for diverting electrons from the flow of negative ions produced by the extractor means.

3. The ion source of claim 2 wherein the means for diverting electrons includes means for providing a magnetic field aligned with respect to the electric field provided by the extractor means to provide ExB drift to the electrons.

4. The ion source of claim 3 wherein the means for providing a magnetic field includes permanent magnets located adjacent the extractor means.

5. The ion source of claim 1 wherein the magnetic filter means includes means for providing a magnetic field transverse to the direction of ions travelling from the ionizing zone to the extraction zone.

6. The ion source of claim 5 wherein the means for providing a transverse magnetic field includes permanent magnets located within the chamber.

7. The ion source of claim 1 including a plurality of permanent magnets positioned around the exterior of the vessel having the chamber formed therein to form multi-cusped magnetic fields within said chamber for repelling ions from contacting the vessel.

8. The ion source of claim 1 wherein the molecules and atoms are hydrogen.

9. The negative ion source of claim 1 wherein the vessel wall forms the anode for the electron discharge.

10. A method of reducing undesired electrons from a negative ion source output flux, comprising the steps of:
    ionizing neutral particles by discharging high-energy electrons into an ionizing zone of an ionizing chamber formed in a vessel;
    reflecting high-energy electrons with a magnetic filter located in the ionizing chamber to prevent those electrons from entering an extraction zone of the chamber;
    extracting negative ions from the extraction zone with an extractor voltage to provide a negative-ion output flux; and
    providing a slight positive bias to a plasma electrode located near the extraction zone so that the extraction zone has an increased plasma potential which inhibits positive ions and accompanying low-energy electrons from being present in the extraction zone and therby prevents those low-energy electrons from being present in the ion source output flux.

11. The ion source of claim 1, wherein the extractor means additionally includes an aperture masking means for controlling the cross-sectional area of an ion output beam from said ion source.

12. The ion source of claim 11, wherein the aperture masking means comprises an apertured plate located intermediate the magnetic filter means and the plasma grid assembly and is electrically connected to the plasma grid assembly.

13. The ion source of claim 1, wherein the magnetic filter means comprises a plurality of hollow members extending across said chamber, each of said hollow members containing at least one permanent magnet therein, said permanent magnets being oriented such that adjacent permanent magnets have opposite magnetic poles facing each other.

14. The ion source of claim 13, wherein each of said permanent magnets has a substantially square cross section, and wherein said hollow members are each provided with a plurality of grooves on the inner surface thereof for receiving and fixing in place the permanent magnets contained therein, said hollow members providing cooling channels adjacent each side of said permanent magnets.

15. The ion source of claim 4, wherein the permanent magnets are located in hollow tubes so as to form passages for cooling fluid between at least some of the faces of the magnets and the interior surfaces of the hollow tubes.

16. The ion source of claim 15, wherein the hollow tubes have a triangular configuration.

* * * * *